Patented Oct. 21, 1952

2,614,978

UNITED STATES PATENT OFFICE 2,614,978

MECHANICAL FOAM FLUID FORMULATION FOR ALCOHOL FIRES

Richard L. Tuve, Silver Spring, Md., and Henry B. Peterson, Washington, D. C.

No Drawing. Application March 26, 1948, Serial No. 17,362

11 Claims. (Cl. 252—8.05)

(Granted under the act of March 3, 1883, as amended April 30, 1928; 370 O. G. 757)

The present invention relates to an improved foam stabilizer and more particularly to a fire-foam stabilizer capable of producing a fire-foam that will effectively extinguish fires occurring in water-miscible fuels, such as alcohol and acetone, as well as ethyl ether, gasoline, oil and other fires.

While various foam stabilizers have been heretofore proposed and used in the production of fire-foam, none of them have proved entirely satisfactory in combatting such fires. Since such fuels, particularly alcohol, are customarily stored in large quantities, the considerable fire hazard from such storage has created a serious demand for an effective fire extinguishing and control medium. While all of the known foam stabilizers have been widely tested for such use, it has been found that even the most efficient stabilizers, those made from the hydrolysis product of proteins obtained from animal and vegetable sources and exemplified by United States Letters Patent to Ratzer numbered 2,324,951 of July 24, 1943, to Bagley and Levin numbered 2,365,619 of December 19, 1944, to Tresise and Ratzer numbered 2,368,623 of February 6, 1945, to Urquhart numbered 2,269,958 of January 13, 1942, and British Patent 571,686, were not satisfactory for combatting fires occurring in water-miscible fuels. This failure resulted because of the rapid disintegration of the foam produced apparently due to the depletion of the water ingredient in the wall of each gas bubble induced by the affinity between such water-miscible fuels and water and the failure of such proteinaceous products to produce any mechanical resistance to such disintegration in the presence of such water-miscible fuels.

It, accordingly, is the primary object of the present invention to produce a foam stabilizer capable of producing an effective fire-foam for combatting fires originating in water-miscible fuels and non-petroleum solvents.

A further important object of the present invention resides in the provision of a foam stabilizer which can be used alone or in combination with conventional stabilizers to, either mechanically or by chemical reaction, produce fire-foam capable of effectively combatting fires originating in water-miscible fuels and non-petroleum solvents.

Another object of the present invention resides in the provision of a foam stabilizer capable of being marketed either in dry powder form or in the form of a concentrated solution for producing fire-foam suitable for controlling and extinguishing such fires.

Still another object of this invention resides in the production of a fire-foam stabilizer made from a protein product exhibiting the properties characteristic of whole egg proteins.

A further object of the present invention is to provide a novel method of converting eggs, such as poultry eggs, into a dry powder capable of use in producing fire-foam.

Still further objects will appear from the following description when read in conjunction with the appended claims.

While poultry eggs themselves, may be employed to produce the stabilizer of the present invention; any protein having the characteristics of whole egg proteins may be used. Assuming eggs are to be used, the stabilizer is formed by first converting the whole eggs to a dry egg powder of the character supplied for food purposes. Such powders, containing the protein compounds in a chemically pure or natural state, may also be purchased commercially to avoid the practice of this first step if desired. While spray-dried egg powder of food quality has been found better suited for the practice of this invention, partially hydrolized whole eggs of food quality produced other than by enzyme action may be suitable.

Such powders are first lixiviated with a fat solvent such as petroleum ether, filtered, and subjected to repeated leachings with successive quantities of petroleum ether to produce a fat free, undecomposed, dehydrated powder residue. This residue is then dried, and when dry, should on test preferably show a loss of approximately 30% by weight of the original egg powder.

The resulting dry powder, assuming the eggs originally had the accepted chemical analysis shown by Circular No. 583 of January 1941, published by the United States Department of Agriculture to be 73% water; 13.3% protein; 11.5% fat; 1.1% nitrogen free extract and other matter, such as free sugar, sodium, magnesium, calcium, sulphur, phosphorous, and chlorine, in minor quantities will be composed primarily of whole egg proteins, comprising albumin, conalbumin, globulin, mucoid, mucin, vitellin and livetin. These proteins when combined as in whole egg powder so produced may be readily combined with water, either plain or salt water, coagulate when subjected to heat, and exhibit a high rate of denaturation in the presence of alcohol, acetone and other non-petroleum solvents. These properties are particularly useful in a fire-foam stabilizer for producing a foam capable of extinguishing alcohol, acetone, and other non-petroleum solvent fires because (1) of the wide availability of water, either plain or salt, for formation of a stabilizer solution, (2) the coagulation characteristics when subjected to the heat of the fire, and (3) the molecular change resulting in increasing the mechanical resistance to disintegration brought about by the denaturation. Such molecular change as is effected by coagulation or denaturation is inherently irreversible and, as a consequence, produces a stable fire-resistant foam.

This dry powder residue or stabilizer may be added to one of the dry powder reactive constituents, preferably the basic powder, commonly marketed as a foam-forming composition for production of chemical foam in the well known manner. The quantity to be added will differ depending upon the particular chemical foam powders with which it is mixed. However, tests conducted to date indicate that an amount should be sufficient to produce a water solution, when mixed with the water stream usually employed in chemical foam production, composed of 6% by weight of the egg powder residue, 12% by weight of the conventional chemical foam reactive powders, and 82% by weight of water. The foam resulting from the described mixture of constituents when produced in the customary manner is highly effective for extinguishing fires in ethyl ether or water-miscible hydrocarbons such as ethyl alcohol, and acetone as well as the usual gasoline and oil fires, and is very tough and tenacious. When used on the aforementioned classes of fires, a tough skin-like layer of foam, apparently resulting from the molecular change heretofore mentioned, is formed on the surface of the fuel under the more or less conventional foam body which readily flows to cover the adjacent exposed areas of the fuel surface. This conventional foam body in addition to functioning in the usual manner to seal in the fuel vapors, exclude oxygen and reduce the surface temperature, also provides a reserve supply of foam which, in event of rupture of the tough skin-like layer, covers the surface of the fuel at the break and produces a new protective skin-like layer at the break.

Unlike the conventional chemical foam, the foam produced as described above retains its water constituent and its foam-like structure even when applied to water-miscible fuels which appear to break down the conventional foam by drawing out its water content. While the explanation of this unusual action is not thoroughly understood, it is probable that the affinity between the water and the cell structure formed by the molecularly altered proteinaceous compounds is sufficient to counteract, to the extent necessary, the normally greater affinity of water-miscible fuels to the water content of conventional foam.

While the ratio of the egg protein constituents to the animal or vegetable protein constituents when the stabilizer of this invention is used with a conventional stabilizer is preferably 6% egg protein solid, 2% conventional hydrolized protein solid, and 92% water; these ratios may be varied within fairly wide limits to obtain the desired results depending upon the type of fuel. For example, using ethyl alcohol as a fuel it has been found that a reduction of this ratio to 2% by weight of egg protein solids and 97% water, produces a relatively ineffective foam which breaks down rapidly and can extinguish the fire only by application of abnormally large quantities of foam to the surface. When this ratio is increased to 18% by weight of egg protein solid, 6% of the conventional hydrolized protein solid and 76% water, an extremely thick, viscous foam is produced which does not flow over the surface to form an extinguishing layer and a substantial lessening of economy is evidenced. Accordingly, this ratio relation should be held at least within these extreme limits and preferably to the proportions mentioned above to assure all-round efficiency and economy in use.

It is also possible to use the egg protein stabilizer of this invention alone to produce a foam-forming composition for mechanical foam systems. When so used the protein-water proportion should be about the same as pointed out above and the only noticeable differences in the foam is a lessening of fluidity and reduction of foam quantity which is not sufficient to be harmful. While maximum efficiency is obtained by combining the stabilizer of this invention with known commercial mechanical foam stabilizers, it will be appreciated that flexibility is possible in producing the foam forming solution to meet economic considerations making elimination of the conventional protein stabilizer ingredient desirable.

From tests conducted with the protein powder residue from egg whites alone or egg yolks alone produced as pointed out above, it would appear that the peculiar combination of protein ingredients from both egg elements together is essential. For tests to date indicate that when whites alone are used, the resulting stabilizer formed according to this invention produces a very stable, cohesive foam but a foam which immediately breaks down upon contact with burning alcohol and is incapable of use to extinguish the fire. These same characteristics plus difficulty in producing the foam occurred when the yolks alone were used in such tests.

While the extraction of the fat ingredient as pointed out above is desirable for production of a foam of maximum efficiency in all presently known foam producing processes, the pulverized egg powder may be used without removal of the fat ingredient.

While the stabilizer powder of this invention is readily usable when premixed with water alone in mechanical foam production systems wherein air or gas is mechanically incorporated into the stabilizer fortified water stream, certain of these systems, employing an eductor for incorporating the stabilizer into the flowing water stream, are designed to utilize a concentrated water solution of the conventional protein stabilizers as the foam forming composition and the stabilizer of this invention must be produced in the form of a concentrated solution to satisfactorily operate in such systems. A suitable concentrated solution can be produced by mixing the dry powder residue heretofore described with water to produce a solution compound of approximately 25% by weight of the egg protein solids of this invention, approximately 10% by weight of the conventional protein solids, and remainder water. Such a concentrated solution will be sufficiently fluid for incorporation in the water stream by such eductor pick-up devices and when mixed 21 parts with 79 parts water by volume will produce excellent mechanical foam having the characteristics and properties heretofore pointed out. Such concentrated solutions should preferably be protected against decomposition, when not immediately used, by the addition of a suitable preservative such as Dowicide (sodium phenate). While a water solvent because of its availability and relatively neutral reaction with the egg proteins, is desirable, other solvents might be used to effect a more highly concentrated solution of sufficient fluidity for use in such mechanical foam systems in final proportions of 6 parts by weight of egg solids to 94 parts by weight of water to thereby reduce the per minute volume of stabilizer concentrate necessary to secure maximum efficiency in these mechanical systems.

If a premix solution is desired for crash trucks employing mechanical foam play pipes or foam forming nozzles, a satisfactory water solution composed of 6% by weight of egg protein solids, and 94% by weight of water can be made and mixed directly with a concentrated solution of conventional hydrolyzed protein stabilizer to provide the desired 6%–2% protein ratio heretofore mentioned.

The mechanical foam produced by these solutions is equally effective in extinguishing fires in water-miscible fuels, ethyl ether, gasoline and oil and the same variations in constituents and the resulting foam have been found to exist.

While whole eggs or the solid spray dried egg powders are preferably employed in making the stabilizer of the present invention, it is believed obvious that frozen eggs, egg concentrates, waste egg products, or even synthetic protein compounds may be successfully employed to produce the stabilizer of this invention as long as the dry powder residue exhibits properties comparable with the powder produced from whole eggs or the spray dried powders heretofore mentioned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention herein may be manufactured and used by or for the Government of the United States of America for governmental purposes without the payment of any royalties thereon or therefor.

What is claimed is:

1. A composition of matter capable of yielding a stable foam on agitation with water which comprises hydrolyzed protein and an amount of whole egg protein up to about 3 parts by weight for each part by weight of the hydrolyzed protein and sufficient to substantially increase the stability of the foam.

2. A composition of matter capable of yielding a stable foam on agitation with water which comprises hydrolyzed protein and whole egg protein in the weight ratio of up to about 3 parts but more than 2 parts of the whole egg protein to each part of the hydrolyzed protein.

3. A composition of matter as defined in claim 1, wherein the whole egg protein is fat-free whole egg protein.

4. A composition of matter as defined in claim 2, wherein the whole egg protein is fat-free whole egg protein.

5. A composition of matter capable of yielding a stable foam on agitation with water which comprises hydrolyzed protein and whole egg protein in the weight ratio of about 3 parts of whole egg protein to each part of hydrolyzed protein.

6. A composition of matter as defined in claim 5, wherein the whole egg protein is fat-free whole egg protein.

7. A dry composition of matter capable of yielding a stable foam on agitation with water which comprises powdered hydrolyzed protein and an amount of powdered whole egg protein up to about 3 parts by weight for each part by weight of the hydrolyzed protein and sufficient to substantially increase the stability of the foam.

8. A dry composition of matter capable of yielding a stable foam on agitation with water which comprises powdered hydrolyzed protein and powdered fat-free whole egg protein in the weight ratio of up to about 3 parts but more than 2 parts of the whole egg protein to each part of the hydrolyzed protein.

9. A dry composition of matter capable of yielding a stable foam on agitation with water which comprises powdered hydrolyzed protein and powdered fat-free whole egg protein in the weight ratio of about 3 parts of whole egg protein to each part of hydrolyzed protein.

10. An aqueous solution of hydrolyzed protein and fat-free whole egg protein in the weight ratio of 1 part of the former to from about 2.5 to about 3 parts of the latter.

11. An aqueous solution of about 10% by weight of hydrolyzed protein and about 25% by weight of fat-free whole egg protein.

RICHARD L. TUVE.
HENRY B. PETERSON.

REFERENCES CITED

The following references are of record in the file of this patent:

UNITED STATES PATENTS

| Number | Name | Date |
|---|---|---|
| 190,640 | Stoddard | May 8, 1887 |
| 2,006,799 | Epstein et al. | July 2, 1935 |
| 2,183,516 | Mink | Dec. 12, 1939 |
| 2,232,053 | Daimler et al. | Feb. 18, 1941 |
| 2,269,958 | Urquhart | Jan. 13, 1942 |
| 2,324,951 | Ratzer et al. | July 20, 1943 |
| 2,365,619 | Bagley et al. | Dec. 19, 1944 |
| 2,431,256 | Keil et al. | Nov. 18, 1947 |
| 2,450,775 | Zahm | Oct. 5, 1948 |
| 2,493,080 | Musher | Jan. 3, 1950 |